United States Patent
Wego et al.

(10) Patent No.: US 7,483,425 B2
(45) Date of Patent: *Jan. 27, 2009

(54) METHOD FOR REDUCING THE AMOUNT OF NEEDED MEMORY IN A TDM SWITCH SYSTEM

(75) Inventors: Arild Wego, Lier (NO); Pål Longva Hellum, Blommenholm (NO)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 750 days.

This patent is subject to a terminal disclaimer.

(21) Appl. No.: 10/500,048

(22) PCT Filed: Dec. 10, 2002

(86) PCT No.: PCT/NO02/00471

§ 371 (c)(1),
(2), (4) Date: Jun. 25, 2004

(87) PCT Pub. No.: WO03/056771

PCT Pub. Date: Jul. 10, 2003

(65) Prior Publication Data

US 2005/0094590 A1    May 5, 2005

(30) Foreign Application Priority Data

Dec. 27, 2001    (NO) ................. 20016372

(51) Int. Cl.
*H04L 15/56* (2006.01)
(52) U.S. Cl. ............ 370/391; 370/362; 370/413; 370/395.4
(58) Field of Classification Search ........... 370/413, 370/230, 395.4, 362, 391
See application file for complete search history.

(56) References Cited

U.S. PATENT DOCUMENTS 4,131,762 A * 12/1978 Reid ................. 370/370

(Continued)

FOREIGN PATENT DOCUMENTS

WO    WO9618278 A    6/1996

OTHER PUBLICATIONS

Minkenberg C et al, "A combined input and output queued packet switched system based on PRIZMA switch on a chip technology" IEEE Communications Magazine, Dec. 2000, IEEE, USA vol. 38, No. 12.

(Continued)

*Primary Examiner*—Hassan Kizou
*Assistant Examiner*—Jeffrey M Rutkowski
(74) *Attorney, Agent, or Firm*—Roger S. Burleigh

(57) ABSTRACT

The present invention discloses an arrangement providing a better utilization of the bus buffer memory in a data node, e.g. a switch. By using one scheduler on both sides of the switch and one timer for each output and input lines in an inventive way for transferring data to and from the time slot buses in the switch, the memory recourses therein are utilized in a more optimal way, also the present invention. Also, by setting up the scheduler parameters in a special way it is possible to obtain very short delays through the TDM switch. The present invention allows for both structured modus (bytes in transfer on the time slot buses are made identifiable) with constant delay and dependent timing, and for unstructured modus with minimum delay and both independent and dependent timing. This contributes to make the invention very useful and unique.

2 Claims, 8 Drawing Sheets

U.S. PATENT DOCUMENTS

| | | | |
|---|---|---|---|
| 5,291,482 A * | 3/1994 | McHarg et al. | 370/413 |
| 5,561,669 A * | 10/1996 | Lenney et al. | 370/352 |
| 6,324,165 B1 * | 11/2001 | Fan et al. | 370/232 |
| 6,931,022 B1 * | 8/2005 | Sanders et al. | 370/442 |
| 7,110,359 B1 * | 9/2006 | Acharya | 370/235 |
| 2001/0033572 A1 * | 10/2001 | Caldara | 370/395 |
| 2006/0002398 A1 * | 1/2006 | Wego et al. | 370/395.4 |

OTHER PUBLICATIONS

European Patent Office, International Search Report for PCT/NO02/00471, dated Mar. 6, 2003.

* cited by examiner

OFFSET=100, NUMBER=24, DISTANCE=10

FS

| 1 | 2 | .... | 100 | .... | 110 | .... | 120 | ........ | Max TS |

Figure 7

METHOD FOR REDUCING THE AMOUNT OF NEEDED MEMORY IN A TDM SWITCH SYSTEM

FIELD OF THE INVENTION

The present invention is related to data nodes in communication networks, in particular to transmitting independent serial data streams through synchronous Time Division Multiplexing (TDM) switches.

BACKGROUND OF THE INVENTION

The lower layer of communication networks like the connectivity layer in a core network of a cellular environment could be seen as a layer of distributed resources for managing data flows. Switches and multiplexers are some of the main components for this purpose. In complex communication networks managing data of different formats and varying data rates, it is of great importance that the construction of the components are flexible without being too complex.

Conventionally, the switches comprise a number of serial inputs and outputs. The data stream of one input may be directed in its entirety to a certain output line, or it may consist of a mixture of time division multiplexed data frames that are to be distributed to several outputs. The different lines may be running various interfaces e.g. E1, E2, E3 and STM-1 (FIG. 1). Additionally, the data speed of each input line may vary in a wide range. The transition of data frames in the switches is often executed by means of time slot buses located on the back plane of the switches.

A variant of such a switch is illustrated in FIG. 2. In this example switch, there are up to 32 serial input lines and 32 serial output lines. The possible data speed of each line should vary from 8 kbit/s up to 45 Mbit/s. The transmission of data is executed on one or more fast TDM buses, transporting the data frames on time slots preferably with a minimum delay.

A problem occurring in switches handling various line interfaces is that each line will need a memory for temporary storage of frames before and after the TDM buses. The higher data rate on each line, the higher the requirement for the storage capacity.

A synchronous digital TDM switch as described in [1] typically needs to store more than two frames of data on each line and in both directions (RX and TX). If such a digital switch shall be a general switch dimensioned for any data rates on any lines (i.e. from 64 kbit/s and up to 45 Mbit/s), a large amount of memory could be necessary unless some restrictions on how the memory access and allocation are established.

The straight forward way to transfer data coming from several data lines over a TDM bus is to allocate memory according to the maximum speed allowed on each line. If the maximum speed on each line is N bytes/frame, and the number of lines are L, then the required amount of memory needed is at least 4×N×L bytes (need to store at least 4 frames of data).

U.S. Pat. No. 6,052,448 uses a method for reducing the amount of needed memory, but this is not done by dynamically allocation of the memory. If the maximum allowed transmission rate for each line is high, a large amount of memory is needed. Delays through the node will probably also be too high, often more than two TDM frames (250 us).

SUMMARY OF THE INVENTION

It is an object of the present invention to provide an arrangement that eliminates the drawbacks described above. The features defined in the claims enclosed characterize this method.

BRIEF DESCRIPTION OF THE DRAWINGS

In order to make the invention more readily understandable; the discussion that follows will refer to the accompanying drawings.

FIG. 7 illustrates an example of how the timers according to the present invention may control the time at which the bytes of a frame is to be transferred.

DETAILED DESCRIPTION OF PREFERRED EMBODIMENTS

The present invention describes a method for reducing the amount of memory needed when transferring data coming from several data lines over a common TDM bus. It also makes it possible to obtain very short data delays through the node.

Figure 1:
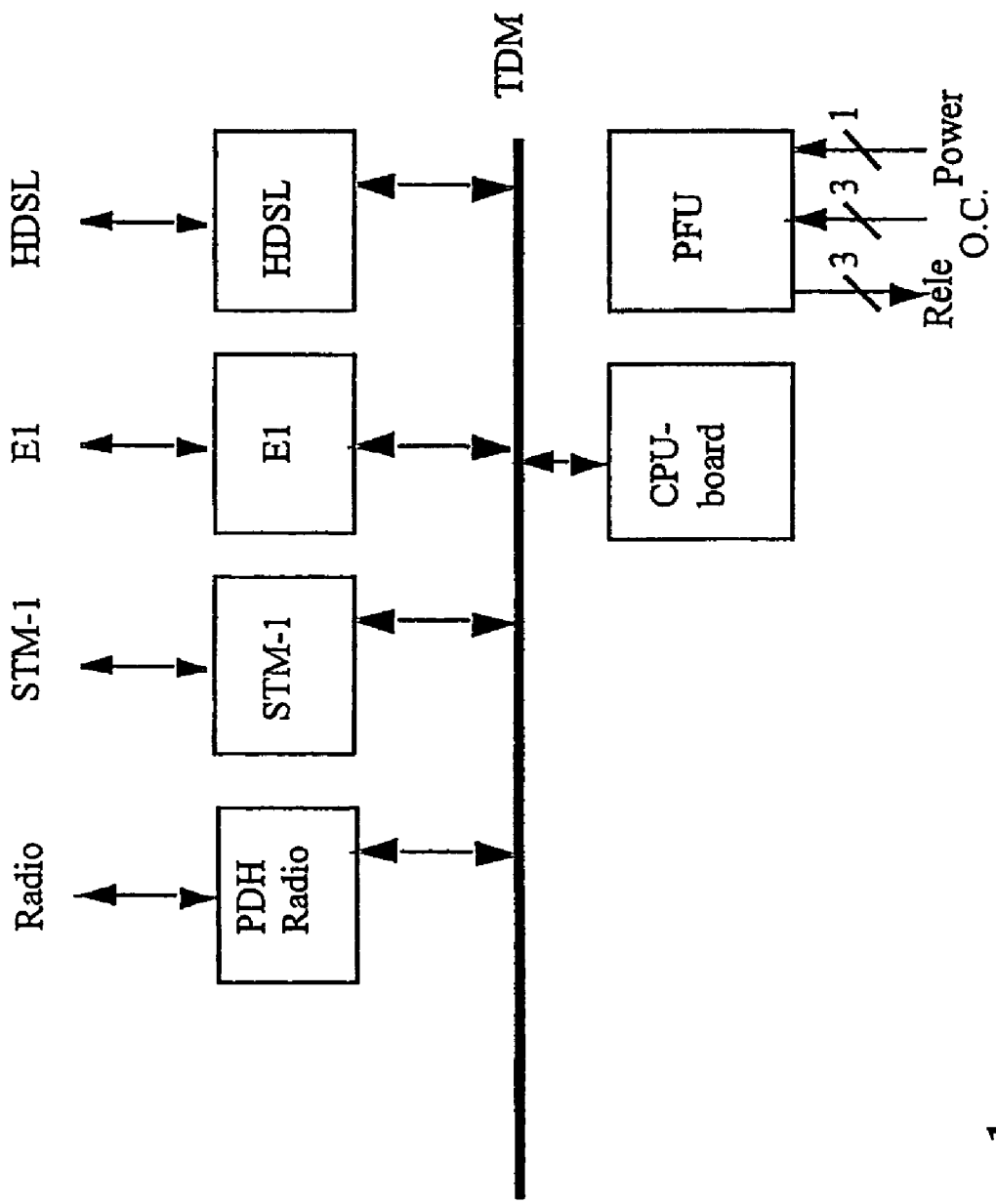
FIG. 1 is a block diagram illustrating an example of serial output/input lines with variable interfaces connected to a TDM bus, e.g. in a switch.
Figure 2:
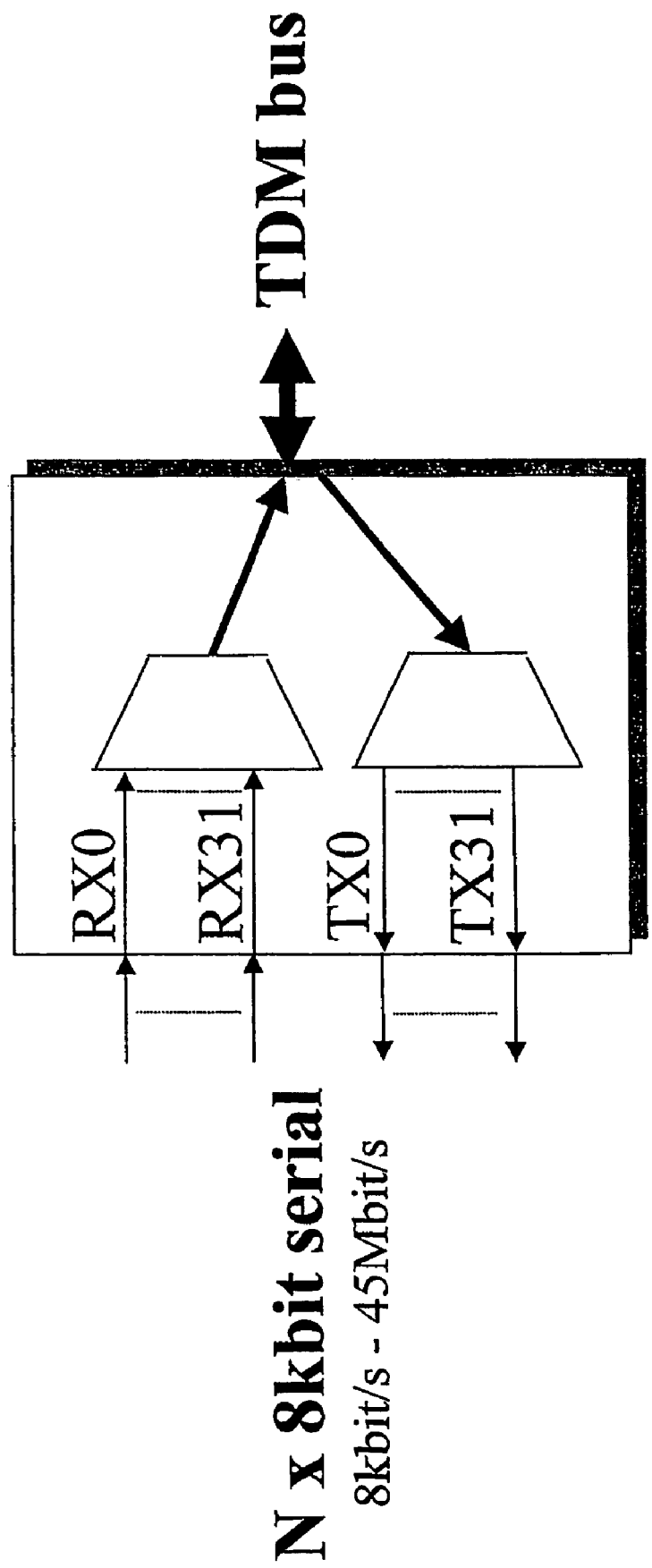
FIG. 2 shows an example switch including its output and input ports and a TDM bus.
Figure 3:
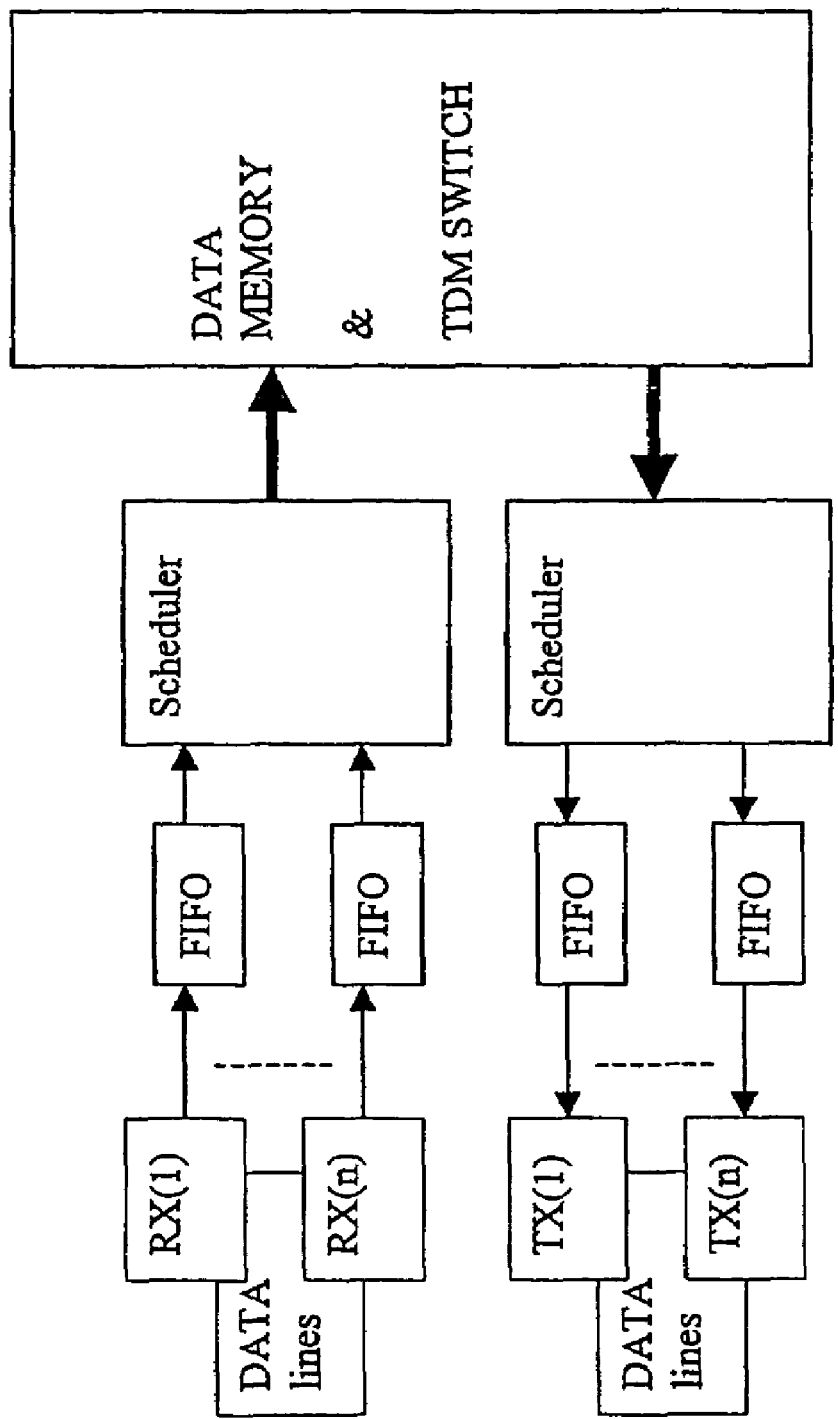
FIG. 3 is closer view of the example switch of FIG. 2 according to the present invention.

According to the present invention, by setting a restriction on the total bandwidth possible to transmit through the node (which is less than the maximum bandwidth for one line multiplied by the number of lines) and also introducing dynamically allocable memories, schedulers and FIFOs (illustrated in FIG. 3) it is possible to reduce the amount of needed memory.

The FIFOs have two main functions. First, they take up jitter and wander variations between the line data rates and an internal master synchronisation signal. Second, since not every data line can access the data memories at the same time, FIFOs must be implemented on each line.

On the transmitting side, the data is stored in FIFOs before it is clocked out with the respective serial clock. Either an internal DPLL or external PLL generates the serial clock. The FIFO is by default (and maximum) 64 bits deep, but can be configured by writing to a register.

On the receiving side, the data is clocked into a FIFO by the serial clock before it is transmitted in one burst of data per frame against the scheduler. The FIFO is by default (and maximum) 64 bits deep, but can be configured by writing to a register.

The schedulers are implemented to give all the lines access to the data memories on a regular basis. It is possible to program exactly at which time the scheduler shall request access to the memory for any ports.

By configuring the TDM switch in a so-called "MINIMUM_DELAY mode" and the scheduler in a special way, very short delays (mainly FIFO delays) through the node (32 us for a 2 Mbit/s link and 64 bit deep FIFOs) may be achieved.

The data memory or buffers is dynamically allocated by software. Each line can get the number of memory locations allocated that is required to store the amount of data for the actual bandwidth on the line.

Conventionally, there is one buffer at the receiving side for each input line. However, according to the present invention, there is instead one or maximum two buffers for each TDM bus that is being shared between the input lines. This module is responsible for storing data coming from the scheduler, and put it onto the back plane bus in the correct timeslots.

In one embodiment of the invention, there are three buses in the back plane, and the data is distributed among them. There are 8192 timeslots available on each bus (66 MHz), which makes 24576 timeslots all together. There will be one set of memory and so-called connection tables for each bus. The data coming from the scheduler will go to all the memory blocks, while the connection tables are configured by software. This means that redundancy on the back plane may be achieved by making two of the connection tables identical. In this way two of the buses are holding the same data. The concept of connection tables will be explained later.

The physical size of the memory blocks may be e.g. 2048 bytes, which means that the system can handle a maximum of 2048 different bytes per frame. The memories are configured in advance with a pointer value for every active port.

Figure 4:
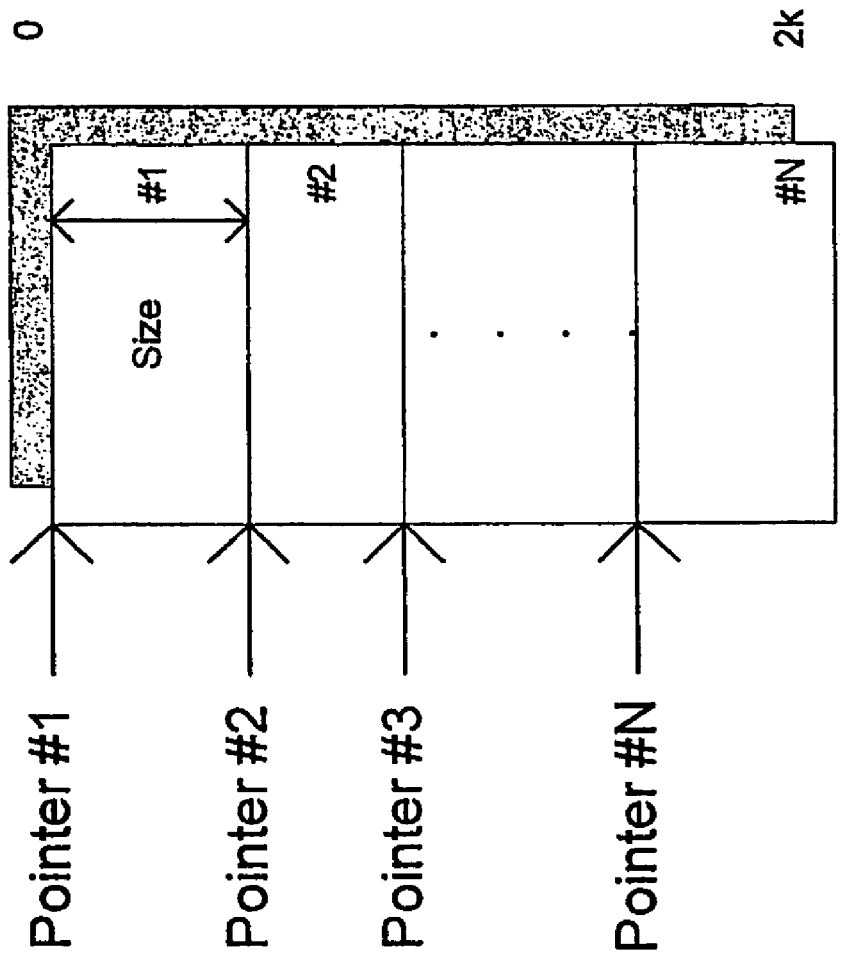
FIG. 4 illustrates a buffer and its allocating pointers according to the present invention.
Figure 5:
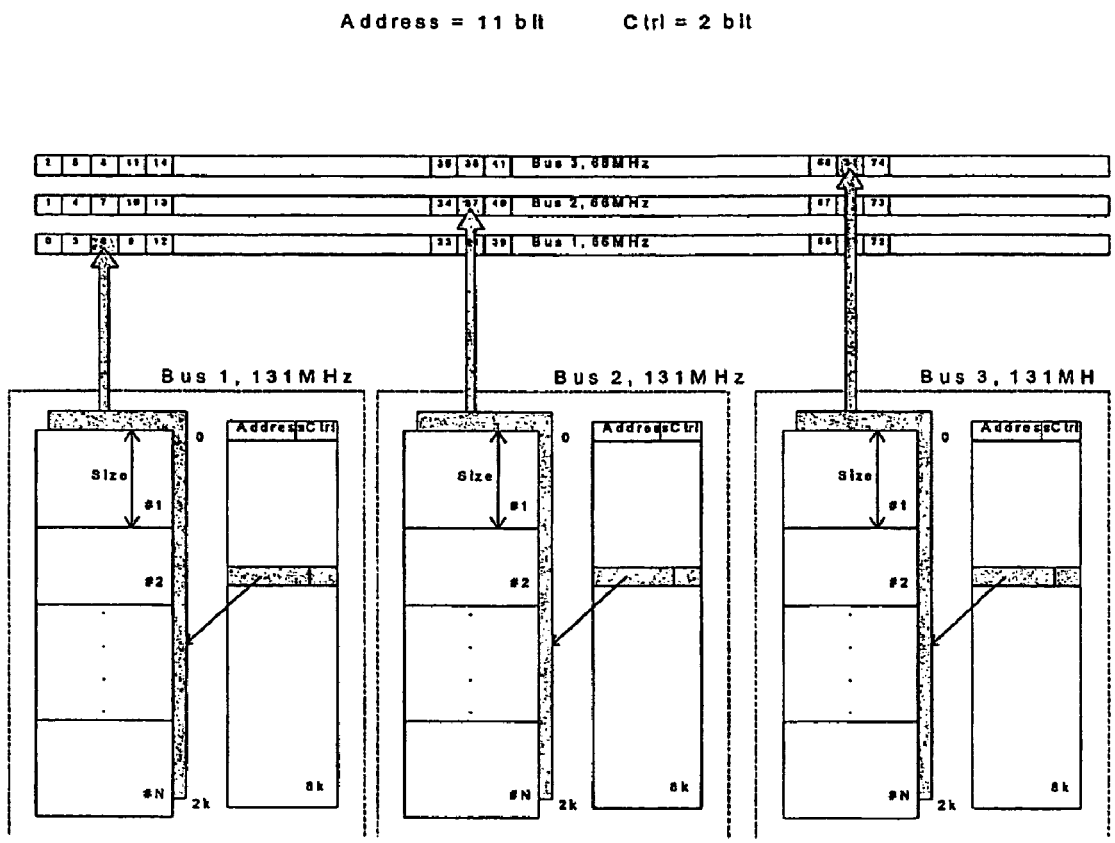
FIG. 5 shows the three different buffers on the receiving side according to an embodiment of the present invention, including connection tables and their interaction with the TDM buses.

The pointer value holds the address where the first byte in a frame is supposed to be stored. This address is loaded into a local pointer at the start of a new frame, and the pointer is incremented after data has been written to this address. The memory can be shared by 32 different ports, but can also be occupied by only one. This concept is shown in FIG. 4. The buffers with their connection tables and TDM buses are illustrated in FIG. 5. In this embodiment, there are three connection tables with 8192 entries each. Each entry has one address field and one control field. The address field points to the location in memory where the data can be found, while the control field holds information about e.g. if the current timeslot is enabled, if it is a minimum delay timeslot etc.

When reading data from the memories to the TDM bus, a timeslot counter is used to index the connection tables. The counter is synchronized to the bus clock, and is incremented along with the timeslots in the back plane. The back plane bus can transfer three different bytes at a time, so the current connection table entry will relate to timeslots x, x+1, and x+2 in parallel.

The main function of the scheduler at the receiving side is to transfer data from the FIFOS into the buffers. In that respect, the scheduler uses a round-robin scheme on the transfer request register to check which ports requesting to transfer data.

Information about which ports are active is stored in the RXSC_ACTP register. Only active ports will be considered in the round-robin scheme. The port with the smallest port number is served first.

When a port has been served (a byte data has been transferred to the buffer), the request bit in the RXSC_TREQ register is cleared, and the scheduler tells the buffer and the FIFO that the transaction is completed. Every time the scheduler receives a frame strobe, the timers for the active ports will automatically set their associated RXSC_TREQ-register-bit to '1'. This will force the scheduler to transfer all the headers before it begins to transfer data.

When the scheduler transfers data from a port to the buffer, it also sends the port address of the port currently transferring data. The port address is a number between 1 and 32, representing the number of the port.

According to the present invention, the scheduler uses timers, one for each line. These timers are individually programmable, and defines when a byte from the memory should be transferred to a serial line (TX direction), or when a byte from the lines should be transferred to the memory (RX direction).

When several lines request a data-transfer at the same time, a round-robin scheduler algorithm is used to serve the requests.

There are 32 timers in the scheduler, one for each port. These timers are individually programmable, and defines when a byte from a serial port are to be written into a buffer.

According to a preferred embodiment of the invention, four registers control each timer. These are called RX_NUMBER, RX_OFFSET, RX_DISTANCE and RX_DISTANCE_RESOLUTION.

RX_NUMBER is defined as the number of bits (excluding the header) to be transferred from a port to the buffer during one frame. This number is a function of the bit rate of the port (PORT_BIT RATE). A port running at a 45 Mb/s bit rate, will need to transfer 5625 bit per frame; while a port running at a 8 Mb/s bit rate, will need to transfer 1024 bit per frame.

Number=125 µs·PORT_BIT_RATE

RX_OFFSET is defined as the number of clock cycles from frame start to the first transfer. This number is a function of RX_DISTANCE, RX_NUMBER and the distance from the last transferred byte to the end of the frame (EOF_DIST). The minimum number for RX_OFFSET is 10, but must be at least 3+(2×(number of active ports)). Note that RX_OFFSET is the transfer of the first byte after the header, unlike in the scheduler at the transmitting side, where TX_OFFSET is the header transfer.

RX_DISTANCE is the number of clock cycles of the system clock, between each transfer. This number is a function of the OFFSET, the NUMBER and the EOF_DIST.

$$DISTANCE = \frac{MAX\_TF - OFFSET - EOF\_DIST}{\frac{NUMBER}{8}}$$

$$MAX\_TF = 125 \ \mu s \cdot 131.072 \ MHz$$

The RX_DISTANCE_RESOLUTION holds a six-bit resolution for the distance. A higher resolution than 1 clock cycle is needed for high-speed ports. As an example the distance for a 45 Mbit port must be 22,625 and not 22 or 23. This is accomplished by setting RX_DISTANCE to 22 and RX_DISTANCE_RESOLUTION to 0,625.

Figure 6:
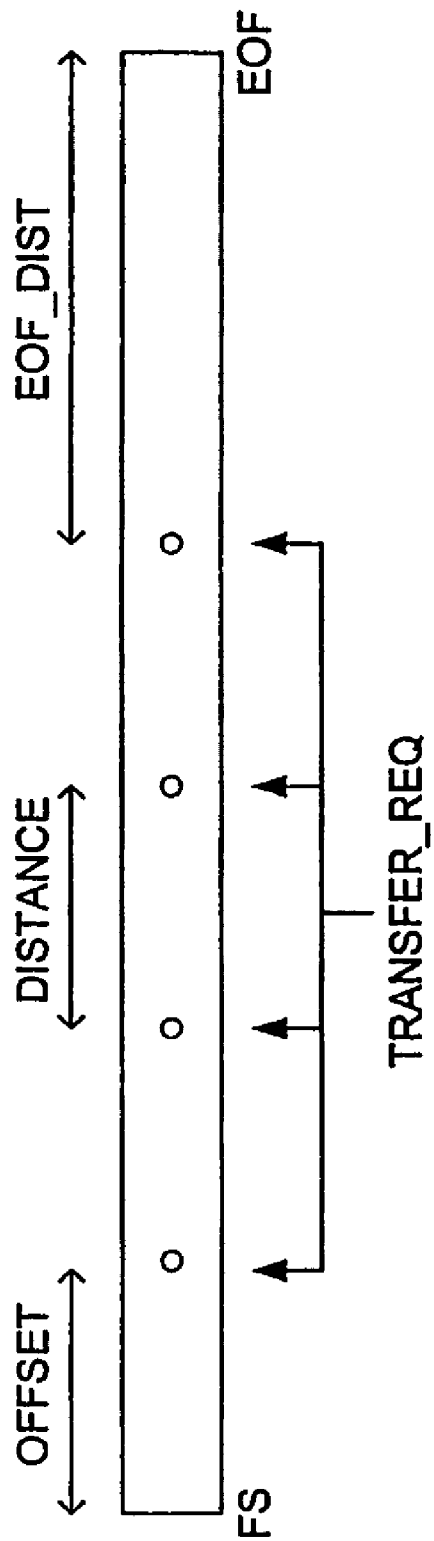
FIG. 6 illustrates the timer parameters according to the present invention in relation with a frame.

The size of the FIFO will preferably be affected by these parameters, and vice versa. If RX_OFFSET or EOF_DIST are small, the RX_DISTANCE will be large and the FIFO size will be small; but if RX_OFFSET and/or EOF_DIST are large, the RX_DISTANCE will be small and the FIFO size will be large. FIG. 6 shows the parameters related to a frame.

With these four parameters it is possible to control exactly when the data is to be transferred from a port to the buffer. FIG. 7 shows an example where 3 bytes are transferred at timeslot 100, 110 and 120.

Each timer sets a bit in a transfer request register (RXSC_TREQ), telling the scheduler that the port is ready to transfer data.

Figure 8:
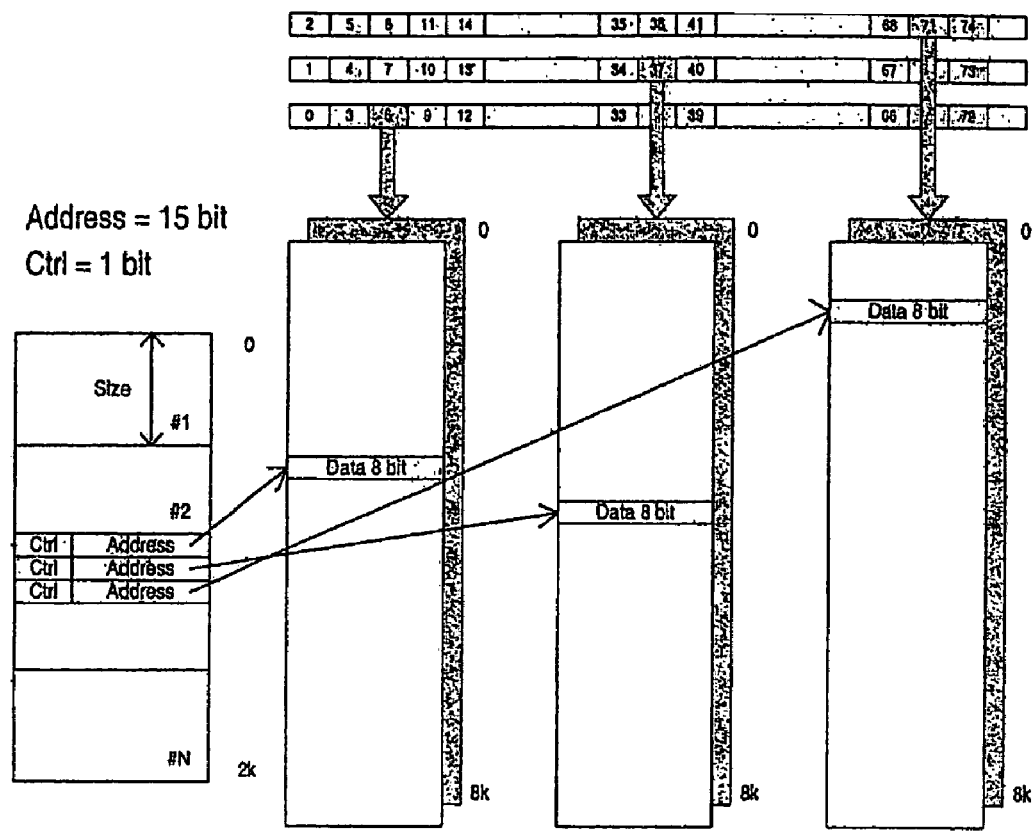
FIG. 8 shows the three different buffers on the transmitting side according to an embodiment of the present invention including the connection table, and their interaction with the TDM buses.

Until now, only the receiving side of the switch is described. However, there is a similar memory/scheduler concept on the transmitting side of the switch. The buffers on the transmitting side and the corresponding connection table are shown in FIG. 8. These modules are responsible for storing data coming from the back plane bus, and pass it on to the scheduler by request.

As already mentioned, in this embodiment, there are three buses in the back plane, and each of them can have 8192 timeslots (66 MHz). This makes 24576 timeslots all together. The data coming from the back plane will go to one large memory, and a connection table then addresses this memory.

The connection table contains addresses and control bits. The addresses are used to point to locations in the large memory, while the control bits can be used to set a minimum delay.

The size of the connection table is set to be 2048 bytes, which means that the system can handle a maximum of 2048 different bytes per frame. The connection table is configured in advance with a size parameter and a pointer value for every active port. The pointer value holds the address where the first memory address can be found. This pointer value is loaded into a local pointer at the start of a new frame, and the pointer is incremented after data has been fetched from the location the pointer is addressing. The connection table can be shared by 32 different ports, but can also be occupied by only one. The size parameter controls the connection table allocation.

A timeslot counter is used to index the large memory when fetching data from the back plane bus. Since there are three buses, three data bytes have to be fetched in parallel.

There is also a scheduler at the transmitting side from the buffers to the FIFOs at the transmitting side. This scheduler also uses a round-robin scheme on the transfer request register to check which ports requesting to transfer data.

There are 32 timers in the scheduler, one for each port. These timers are individually programmable, and defines when a byte from a buffer should be transferred to a serial port.

If several ports request a data-transfer at the same time, a round-robin scheduler algorithm is used to serve the requests.

The scheduler uses a round-robin scheme on the transfer request register to check which ports want to receive data. Information about which ports are active is stored in the TXSC_ACTP register.

Only active ports will be considered in the round-robin scheme. The port with the smallest port number is served first.

When a port has been served (a byte data has been transferred to the buffer of the port), the request bit in the TXSC_TREQ register is cleared.

When the scheduler is ready to transfer data from the buffer it sets up the port address for the port that wants to receive data, and sends this address to the buffer. The port address is a number between 1 and 32, corresponding to the number of ports. The scheduler also sends a read signal to the buffer to tell it when it should write out the data on the 8-bit bus.

There are 32 timers in the scheduler, one for each port. These timers are individually programmable, and defines when a byte from a serial port are to be written into a buffer. The timing in the scheduler is not dependent on the bus frequency. It is only dependent on the system clock.

According to a preferred embodiment of the invention, four registers control each timer. These are called TX_NUMBER, TX_OFFSET, TX_DISTANCE and TX_DISTANCE_RESOLUTION. When the timer reaches the TX_OFFSET value, the timer will automatically set its associated TXSC_TREQ-register-bit to '1'. This will force the scheduler to transfer the header before it begins to transfer data.

When the scheduler has transferred data to a port, it clears the TXSC_TREQ-register-bit for this port and tells the FIFO that the transaction is completed.

TX_NUMBER is defined as the number of bits (excluding the header) to be transferred from a buffer to a port during one frame. This number is a function of the bit rate of the port (PORT_BIT_RATE). A port running at a 45 Mb/s bit rate, will need to transfer 5625 bit per frame; while a port running at a 8 Mb/s bit rate, will need to transfer 1024 bit per frame.

$$\text{Number} = 125 \ \mu s \cdot \text{PORT\_BIT\_RATE}$$

TX_OFFSET is the number of cycles from a frame start to the first transfer. This number is a function of TX_DISTANCE, TX_NUMBER and the distance from the last transferred byte to the end of the frame (EOF_DIST). TX_OFFSET is also dependent on whether the port is running in a minimum delay mode or a constant delay mode. In the case of minimum delay the minimum number for TX_OFFSET is a product of the actual delay from the receiving to the transmitting scheduler, but for regular mode the OFFSET can be set to minimum one.

Note that TX_OFFSET is the header transfer, unlike in the receiving side, where RX_OFFSET is the first byte after the header.

In scheduler-loop mode the TX_OFFSET is the first byte after the header and need to be set up with the same value as the RX_OFFSET register.

It is preferred that all TX_OFFSETS in a minimum delay are set to different values. It is also recommended that the data for a port be spread out equally across the frame to avoid under- or overflow in the FIFOs.

TX_DISTANCE is the number of clock cycles of the system clock, between each transfer. This number is a function of TX_OFFSET, TX_NUMBER and the EOF_DIST.

$$\text{DISTANCE} = \frac{\text{MAX\_TF} - \text{OFFSET} - \text{EOF\_DIST}}{\frac{\text{NUMBER}}{8}}$$

$$\text{MAX\_TF} = 125 \ \mu s \cdot 131.072 \ \text{MHz}$$

TX_DISTANCE_RESOLUTION holds a six-bit resolution for the distance. A higher resolution than 1 clock cycle is needed for high-speed ports. As an example the distance for a 45 Mbit port must be 22,625 and not 22 or 23. This is accomplished by setting TX_DISTANCE to 22 and TX_DISTANCE_RESOLUTION to 0,625.

The size of the FIFO in the TX FRAME module will be affected by these parameters and vice versa. If OFFSET or EOF_DIST are small, the DISTANCE will be large and the FIFO size will be small; but if OFFSET and/or EOF_DIST are large, the DISTANCE will be small and the FIFO size will be large.

With these four parameters it is possible to control exactly when the data is to be transferred from a buffer on the transmitting side to the ports. Each timer sets a bit in a transfer request register (TXSC_TREQ), telling the scheduler that the port is ready to accept new data.

The present invention may work either in a minimum delay mode or a constant delay mode. The minimum delay mode may e.g. be used in cases where the frames from a certain input line does not have to arrive at the transmitting side in the same order as they arrived at the receiving side. For achieving minimum delay, the register values may be configured by means of the following algorithm.

1. Find the NUMBER value by dividing the ports speed by 8000. If the port speed is 34,368 Mbit/s then NUMBER shall be 34.368.000/8000=4296. This number indicates the number of bits transferred each frame.
2. Find the DISTANCE (registers DIST,DISTRS) value by dividing 131072 (system clock speed) by the (NUMBER+8). If NUMBER is 4296 then DISTANCE shall be 131072/(4296+8)=30,453531. This value can be represented by the binary representation 11101,011101=16+8+4+1+0.25+0.125+0.0625+0.015625=30,453125 which is very near 30,453531. The registers DIST and DISTRS shall then both have the values 30 (11101) (DIST,DISTRS).
3. The RX_OFFSET value should be set to 3+2×N (N=number of active ports). If e.g. 8 ports are used, then RX_OFFSET should be set to 3+2×8=19
4. The TX_OFFSET value is given by 131072−NUMBER×DISTANCE−RX_OFFSET−64−20. Lets say NUMBER=4296, DIST=30, DISTRS=30, RX_OFFSET=19 then TX_OFFSET should be 131072−4296×30,453125−19−64−20=142. The numbers 64 and 20 corresponds to time for header transfer and time margin, respectively, because of asynchronous clock domains.

In addition to select between minimum delay and constant delay for any timeslot, the connection tables at the receiving side are used to set up a connection from the input ports to the TDM timeslots. The connection table on the transmitting side sets up a connection from the TDM timeslots to the output ports. The following algorithm may be used to configure these tables.

Find the TDM timeslot as described below. In the address field in the connection table of the receiving side indicated by the TS_NUMBER(ts) write the value ts. In the address field in the connection table of the transmitting side indicated by ts, write the value TS_NUMBER(ts).

By using the scheduler configuration described above, the following can be used to select TDM timeslots for a minimum delay connection.

TS_NUMBER(ts)$_{min}$=(RX_OFFSET+64+6+DISTANCE*ts)*ct_clk(freq)/131072000
TS_NUMBER(ts)$_{max}$=(TX_OFFSET−6+DISTANCE*ts)* ct_clk(freq)/131072000

With the number found above, and ct_clk frequency=default TDM bus frequency we get the following min and max values:

TS_NUMBER(ts)$_{min}$=(19+64+6+30,453125*ts)*3*43,691/131,072=99+10,151042*ts
TS_NUMBER(ts)$_{max}$=(142−6+30,453125*ts)*3*43,691/131,072=136+10,151042*ts Where ts is the serial bit stream timeslot number and TS_NUMBER is the TDM-bus timeslot number on one of the three TDM-buses. TS_NUMBER shall be rounded down to the nearest integer value. The ideal selection of TS_NUMBER(ts) is in the middle between TS_NUMBER(ts)$_{min}$ and TS_NUMBER(ts)$_{max}$.

The combination of a round robin scheduler connecting several data lines with FIFOs to a common memory make it possible to dynamically allocate the memory needed for each line. This reduces the amount of needed memory. The scheduler also reduce the need of large FIFOs since the scheduler give each port access to the data memory on a regular basis. It also makes it possible to transfer data through the node with very short delays. Typical delays for a 2 Mbit/s in minimum delay mode are 32 us against 300 us in constant delay mode.

An example of data RAM saving at the receiving side is discussed below.

Consider three requirements:
1. It shall be possible to connect 32 lines to the memory
2. Each line shall have the possibility to be configured for data rates from 64 kbit/s to 45 Mbit/s
3. The total capacity for the node need to be at least 64 Mbit/s Without a dynamically allocated memory concept about 700 bytes (needed for 45 Mbit/s) of memory for each line would have to be allocated to store one frame of data. This means 32×700 bytes=22.400 bytes per frame. With a dynamically allocation scheme we only need to allocate memory according to the total capacity which is about 1.000 bytes per frame (needed for 64 Mbit/s).

The main advantages with the present invention are that it provides a better utilization of buffer memory, and that it requires shorter FIFOs on both sides.

In addition to reduce the required amount of data storage, the scheduler gives each port access to the data memory on a regular basis so that only small FIFOs are needed.

Also, by setting up the scheduler parameters in a special way it is possible to obtain very short delays through the TDM switch. The total delays through the node may be mainly reduced to the FIFO delays.

Finally, the present invention allows for both structured modus (the bytes in transfer on the time slot buses are identifiable) with constant delay and dependent timing, and for unstructured modus with minimum delay and both independent and dependent timing. This contributes to make the invention very useful and unique.

The present invention is of principal character and describes streaming of data. The invention will therefore be of interest within other areas other than those described here.

Abbreviation & References
FIFO First In First Out
RX Receive direction (from local TDM bus to back plane TDM bus)
TX Transmit direction (from back plane TDM bus to local TDM bus)
[1] ETO/M/N/A-97:616; Synchronous Digital Switch; Reidar Schumann Olsen

The invention claimed is:
1. A communication network node, said node comprising:
one or more time slot buses for transferring frames from a number of serial input lines located on a receiving side of the node to a number of serial output lines located on the transmitting side of the node, the serial input/output lines each having one respective FIFO into/from which bits corresponding to the associated serial line are shifted;
one or two data buffers for each time slot bus at the receiving side of the node for buffering the frames from the input lines before transmission, said one or two data buffers being shared between all the input lines by means of respective pointers allocating one memory area in a data buffer for each of the input lines;
a scheduler for consecutively checking the input lines for data transfer requests, and if a data transfer request exists, transferring one or more data bytes associated with the input line corresponding to the data transfer request to the data bus buffer; and a timer for each input line for indicating the time at which data transfer requests for the respective input line are to occur;

wherein the time at which data transfer requests for an input line are to occur is dependent on the number of data bits to be transferred from the input line to the data bus buffer during one frame (NUMBER), the number of clock cycles from frame start to the transfer of the first byte after the header (OFFSET), the average number of clock cycles between each transfer (DISTANCE), the distance from the last transferred byte to the end of the frame (EOF-DIST), and the resolution for the average number of clock cycles between each transfer (DISTANCE_RESOLUTION), according to the following relationships:

$$DISTANCE = (MAX\_TF - OFFSET - EOF\_DISTANCE)/(NUMBER/8)$$

and $$RX\_DISTANCE = DISTANCE + DISTANCE\ RESOLUTION,$$

where MAX_TF = 125 μs · 131.072 MHz.

2. A communication network node, said node comprising:

one or more time slot buses for transferring frames from a number of serial input lines located on a receiving side of the node to a number of serial output lines located on the transmitting side of the node, the serial input/output lines each having one respective FIFO into/from which bits corresponding to the associated serial line are shifted;

one or two data buffers for each time slot bus at the transmitting side for buffering the frames from the one or more time slot buses before forwarding to the output line, the data buffers being shared between all the output lines by means of respective pointers allocating one memory area in a connection table for each of the output lines, each entry in the connection table contains at least a data bus address pointing to a byte in one of the data buffers, the entries arranged in the same order as their corresponding bytes are to be transferred to an output line;

a scheduler for consecutively checking the output lines for data transfer requests, and if a data transfer request exists, transferring one or more data bytes associated with the output line corresponding to the data transfer request from one of the data bus buffers to that output line; and, a timer for each output line for indicating the time at which data transfer requests for the respective output line are to occur;

wherein the time at which data transfer requests for an output line are to occur is dependent on the number of data bits to be transferred from a data bus buffer to the output line during one frame (NUMBER), the number of clock cycles from a frame start to the transfer of the frame header (OFFSET), the average number of clock cycles between each transfer (DISTANCE), the distance from the last transferred byte to the end of the frame (EQE-DIST), and the resolution for the average number of clock cycles between each transfer (DISTANCE_RESOLUTION), according to the following relationships:

$$DISTANCE = (MAX\_TF - OFFSET - EOF\_DISTANCE)/(NUMBER/8)$$

and $$RX\_DISTANCE = DISTANCE + DISTANCE\ RESOLUTION,$$

where MAX_TF = 125 μs · 131.072 MHz.

* * * * *

UNITED STATES PATENT AND TRADEMARK OFFICE
CERTIFICATE OF CORRECTION

PATENT NO.       : 7,483,425 B2
APPLICATION NO.  : 10/500048
DATED            : January 27, 2009
INVENTOR(S)      : Wego et al.

It is certified that error appears in the above-identified patent and that said Letters Patent is hereby corrected as shown below:

On the Title Page, item (51), under "Int. Cl.", in Column 1, Line 2, delete "15/56" and insert -- 12/56 --, therefor.

In Fig. 5, Sheet 5 of 8, delete "Bus 3, 131 MH" and insert -- Bus 3, 131 MHz --, therefor.

In Column 2, Line 2, delete "(250 us)." and insert -- (250 µs). --, therefor.

In Column 3, Lines 10-11, delete "(32 us" and insert -- (32 µs --, therefor.

In Column 3, Line 58, delete "FIFOS" and insert -- FIFOs --, therefor.

In Column 4, Line 58, delete "example" and insert -- example, --, therefor.

In Column 4, Line 59, delete "22,625" and insert -- 22.625 --, therefor.

In Column 4, Line 61, delete "0,625." and insert -- 0.625. --, therefor.

In Column 6, Line 55, delete "example" and insert -- example, --, therefor.

In Column 6, Line 56, delete "22,625" and insert -- 22.625 --, therefor.

In Column 6, Line 58, delete "0,625." and insert -- 0.625. --, therefor.

In Column 7, Line 11, delete "34,368" and insert -- 34.368 --, therefor.

In Column 7, Line 12, delete "34.368.000/8000=4296." and insert -- 34,368,000/8000=4296. --, therefor.

In Column 7, Line 17, delete "30,453531." and insert -- 30.453531. --, therefor.

In Column 7, Line 18, delete "11101,011101" and insert -- 11110,011101 --, therefor.

In Column 7, Line 19, delete "4+1" and insert -- 4+2 --, therefor.

UNITED STATES PATENT AND TRADEMARK OFFICE
CERTIFICATE OF CORRECTION

PATENT NO.       : 7,483,425 B2
APPLICATION NO.  : 10/500048
DATED            : January 27, 2009
INVENTOR(S)      : Wego et al.

It is certified that error appears in the above-identified patent and that said Letters Patent is hereby corrected as shown below:

In Column 7, Line 19, delete "30,453531." and insert -- 30.453531. --, therefor.

In Column 7, Line 20, delete "30,453531." and insert -- 30.453531. --, therefor.

In Column 7, Line 30, delete "30,453125" and insert -- 30.453125 --, therefor.

In Column 7, Line 55, delete "30,453125" and insert -- 30.453125 --, therefor.

In Column 7, Line 57, delete "30,453125" and insert -- 30.453125 --, therefor.

In Column 8, Line 6, delete "32 us against 300us" and insert -- 32 μs against 300 μs --, therefor.

In Column 8, Line 18, delete "22.400" and insert -- 22,400 --, therefor.

In Column 8, Line 20, delete "1.000" and insert -- 1,000 --, therefor.

In Column 10, Line 25, in Claim 2, delete "(EQE-DIST)," and insert -- (EOF_DIST), --, therefor.

Signed and Sealed this

Twenty-sixth Day of May, 2009

JOHN DOLL
*Acting Director of the United States Patent and Trademark Office*